United States Patent [19]

Eggen

[11] 4,093,691

[45] June 6, 1978

[54] METHOD FOR MANUFACTURING MOULDED PLASTIC ARTICLES

[76] Inventor: Gerardus Theodorus Joseph Eggen, 450, van der Helmstraat, Rotterdam 14, Netherlands

[21] Appl. No.: 589,512

[22] Filed: Jun. 23, 1975

Related U.S. Application Data

[63] Continuation of Ser. No. 346,658, Mar. 30, 1973, abandoned.

[30] Foreign Application Priority Data

Apr. 6, 1972  Netherlands ..................... 7204628

[51] Int. Cl.² .............................................. B29C 17/04
[52] U.S. Cl. ........................................ 264/93; 264/94; 264/113; 264/119

[58] Field of Search .................. 264/89, 93, 94, 109, 264/90, 92, 113, 119

[56] References Cited

U.S. PATENT DOCUMENTS

| 3,336,424 | 8/1967 | Cheney | 264/93 |
| 3,471,601 | 10/1969 | Goetgheluck | 264/93 |

*Primary Examiner*—Robert F. White
*Assistant Examiner*—James R. Hall
*Attorney, Agent, or Firm*—Haseltine, Lake & Waters

[57] ABSTRACT

Method for manufacturing articles from synthetic material by means of a mould, wherein a compression medium is caused to act upon the plastic mass fixed to a non-porous support, from the circumference of the mould in such a way, that the plastic mass is pressed from a support into the mould.

5 Claims, 18 Drawing Figures

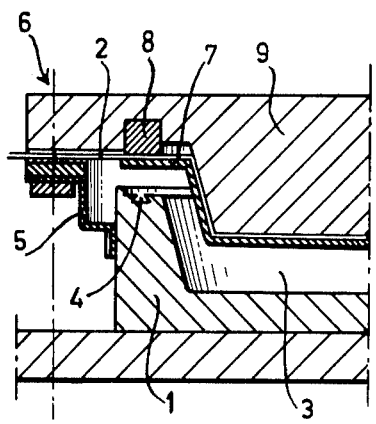
FIG:1.
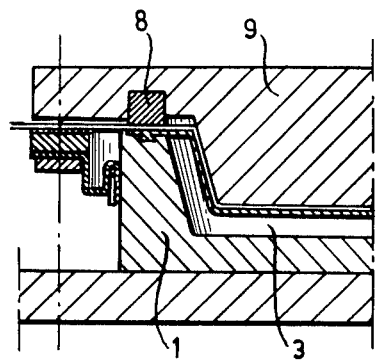
FIG:2.
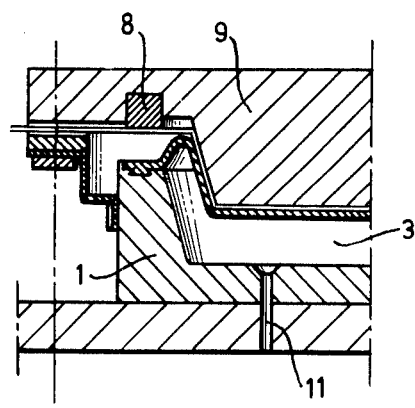
FIG:3.
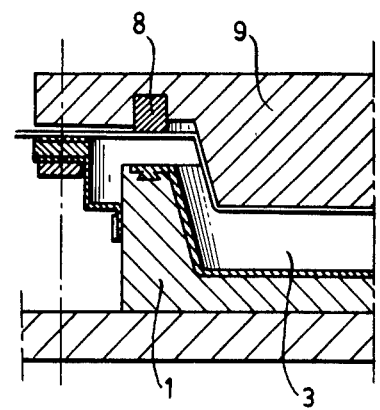
FIG:4.

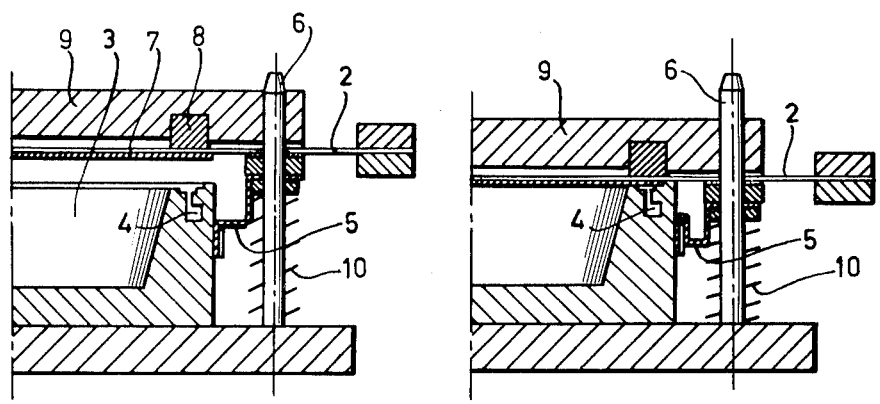
FIG:5.   FIG:6.
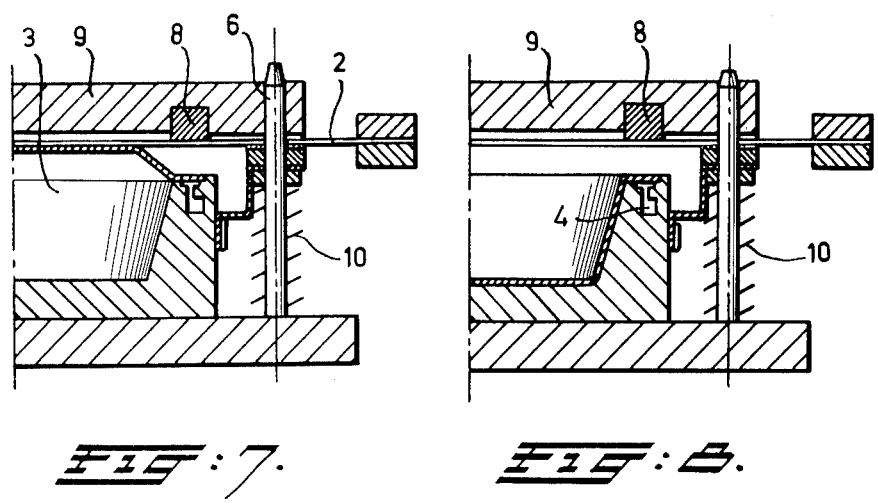
FIG:7.   FIG:8.

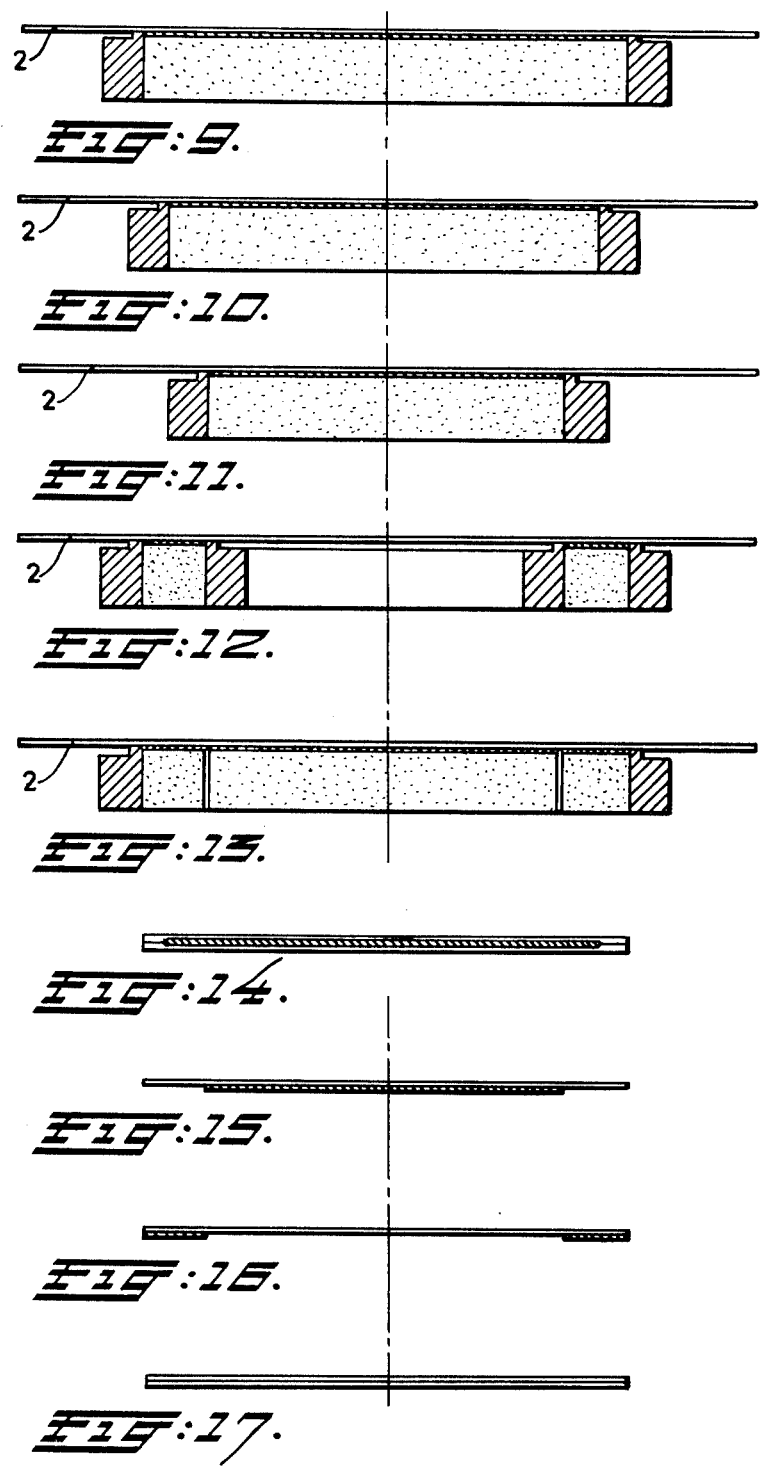

METHOD FOR MANUFACTURING MOULDED PLASTIC ARTICLES

This application is a continuation of co-pending application, Ser. No. 346,658 filed Mar. 30, 1973, now abandoned and claims the priority of the application filed in the Netherlands on Apr. 6, 1972.

DISCUSSION OF THE PRIOR ART

My invention relates to a method for manufacturing articles from synthetic material by means of a mould, which comprises subjecting a heated plastic mass in softened deformable condition to an external overpressure with respect to the interior of the mould.

Such a method according to which a foil softened by heating is deformed by deep drawing or a mechanical process is known per se from the art.

This known method has the drawback that deformation of a moulded plastic article, starting from a plastic mass, can only be effected within a rather small range of temperature. The temperature at which the formation of a plastic article is effected is low to such an extent that the homogeneity and the distribution of temperature in the article is often not satisfactory. In order to improve this homogeneity and distribution of temperature extra provisions would be required, which, however, involves extra costs.

SUMMARY OF THE INVENTION

My invention aims to provide a method whereby the afore-mentioned drawbacks are obviated to a considerable extent.

According to my invention this is attained by sealingly fixing a plastic mass attached to a supporting surface along the circumference of a mould, whereupon a compression medium is caused to act on this plastic mass from the circumference of the upper edge thereof in such a way that the plastic mass is pressed from the support.

When applying these measures deformation can be effected at temperatures higher than usual so far, while also homogeneity in the final product is improved.

There is, as a matter of fact a very important difference between the method according to my invention and known methods, owing to which a heated plastic mass is pressed into a mould. In the latter case the plastic mass is namely drawn from the center to adapt the mass to the walls of the mould. On performing the method according to the invention deformation is, however, effected more gradually, as the center of the plastic material used for deformation, is still retained by the support, when the plastic between the retained portion and the edge of the mould is already separated from this support and is subjected to a deformation due to an external overpressure.

According to the method of my invention, the plastic material is subjected gradually from the circumference towards the center to the forces produced in deforming a container, contrary to the known methods according to which deformation definitely begins in the center, whereas a quite different distribution of forces is produced in the plastic mass.

At the high temperature at which moulding is effected and owing to the fact that the inner side of the mass contacting the support is hotter than the outer side, the inner side of the container moulded from that mass will be very smooth due to the high surface energy.

Advantageously the plastic mass is previously caused to adhere to a supporting surface by applying pulverulent synthetic material to the support and heating this mass such that it sinters together, in order to obtain a surface devoid of pores on the side of the mass contacting the support.

It is further advisable to deposit one or more layers of a plastic mass which are mutually independent, while the dimensions and the degree of fusion mutually differ and whereby, if desired, a layer is constructed from various mutually independent parts, the composition of which is mutually differing.

SURVEY OF THE DRAWINGS

FIGS. 1 to 4 represent four phases during the formation of a plastic article;

FIGS. 5 to 8 likewise show four phases of the formation of a plastic article by means of another embodiment of a device according to the invention;

FIGS. 9 to 13 show five different ways of applying (by means of a stencil) material to a support, and FIGS. 14 to 17 show four different ways of applying various layers of material.

FIG. 18 is another embodiment of a device according to the invention.

DESCRIPTION OF A PREFERRED EMBODIMENT

Figure 1B:
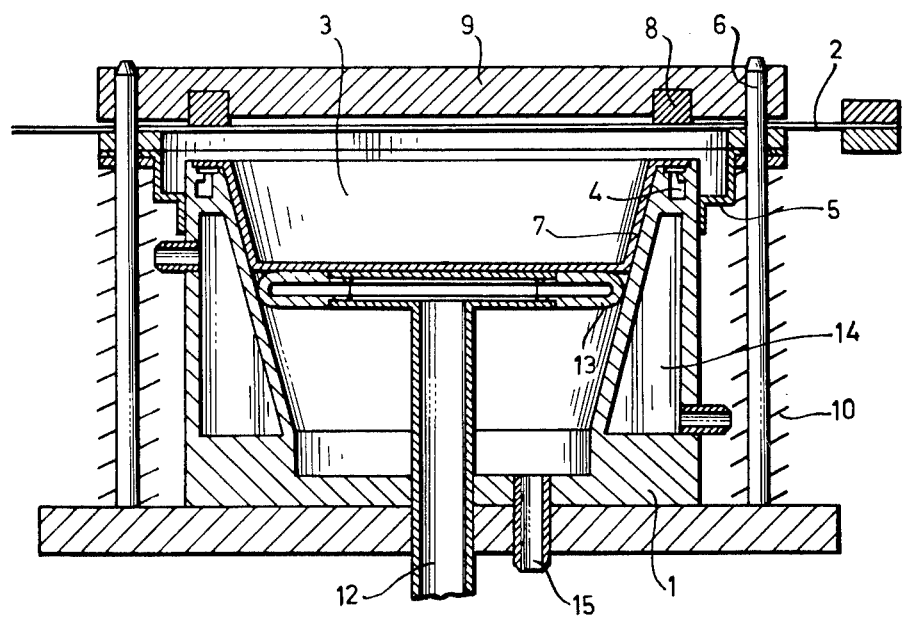

In FIGS. 1 to 8 are represented a mould 1, a support 2, a closed space 3, a gutter 4, a gaiter 5, a guide pin 6 and a plastic mass 7. A cooler 8 is situated in the supporting plate 9 for the support 2. Around the guide pin 6 is a spring 10. A suction channel 11 is shown in FIG. 3.

FIGS. 9 to 11 show three ways of applying material to the support 2, the plastic masses having a different diameter. In FIG. 12 an annular plastic mass is applied, while FIG. 13 shows how two different plastic masses are applied simultaneously.

FIGS. 14 to 17 show some results obtained in applying layers when more ways of applying layers as shown in FIGS. 9 to 13, are combined.

FIG. 14 shows the result when consecutive layers are applied as shown in FIGS. 9 and 10, the central layer having a composition different from that of the two other layers. The central layer can, for example, consist of polyethylene with a pigment, whereas the two outer layers consist of colourless polyethylene.

FIG. 15 represents two layers formed according to the method of FIGS. 9 and 11 and FIG. 16 shows two layers formed as a combination of the method shown in FIGS. 9 and 13.

FIG. 18 shows another embodiment of a device according to my invention. This device corresponds substantially with that as represented in FIGS. 5 to 8. To the device a mobile piston 12 with a resilient rim 13 is added, which presses against the wall of the mould. In the wall a pocket 14 is provided with an inlet and outlet. At the lower end of the mould is an inlet or outlet 15 for a medium for reciprocation of the piston.

In performing the method one proceeds as follows:

At sinter temperature firstly one or more layers of pulverulent plastic material, e.g. polyethylene or polypropylene are applied to the support, heated to a temperature ranging from 200° to 400° C, according to any of the embodiments as represented in FIGS. 9 to 13. In case of more layers the arrangements shown in FIGS. 14 to 17 can be applied. The layers may be differently composed and coloured, they may also have different shapes e.g. circular, square or star-shaped. The pulverulent material can be deposited by means of a fluid bed technique or by electrostatic deposition, but it is also possible to apply the plastic material as a suspension or solution.

Thereupon support 2 is brought over the mould 1 (FIGS. 1 and 5) and closed in an airtight manner by gaiter 5. The plastic mass on the support has a temperature such that the plastic mass in contact with the surface of the support is softened and is rendered devoid of pores. This temperature amounts to 300° C e.g. for polyethylene. The support 2 is thereupon applied against the mould (FIGS. 2 and 6) whereupon the plastic mass 7 is cooled at the location of the edge of the mould 1 by means of the cooler 8. Thereafter the support and mould are moved apart (see FIGS. 3 and 7), whereby the marginal part of the plastic mass still adheres to the edge of the mould. By exerting pressure in the cavity formed by gaiter 5, the support 2 and the plastic mass and by creating a vacuum in the mould pocket (via suction channel 11) the still softened mass, will be pressed into the mould and cover the wall of the mould 1, as shown in FIGS. 4 to 8.

Thus a plastic container can be formed in a simple manner, for instance in one second. The support 2 can be constructed flat, (FIGS. 5 to 8). It is also possible to construct the support as depicted in FIGS. 1 to 4. The support has then already for the greater part the desired shape (first shape) of the container and after removing the plastic mass from the support, only a slight deformation of the plastic mass will be necessary.

In FIG. 18 a quite different construction of the device is represented. Here a flat support is positioned over a mould with a movable piston-shaped 12. First the plastic mass is caused to adhere to the edge of the mould, as described hereinbefore or by means of a ring clamping the edge, thereupon the mass is loosened from the support by means of air pressure (e.g. an overpressure ranging from 0.5 to 3 atmospheres) and subsequently pressed into the mould. The container takes its final configuration when the piston is moved downwards. The temperature of the mould is then maintained at a value ranging e.g. from 160° to 170° C for polyethylene by causing hot liquid to flow through the pocket 14.

During the downward movement of the piston 12, the hot liquid can be replaced with cooling liquid whereby a forced cooling is achieved. One can also wait for the time of one or more cycles until, while adding cooling oil, the article in its first shape is cooled down to 10° to 15° below the crystalline fusion point, whereupon the article in its first shape is drawn deep by means of mechanical aids until a final configuration is imparted thereto.

The piston can be formed for instance with a resilient rim 13 which is pressed against the tapering wall by means of medium pressure. Consequently the plastic mass will remain over the piston and not flow down therealong.

The support may be manufactured from e.g. metal, synthetic material or metal with a plastic coating.

Since the plastic mass, when the same still contacts the support, will be hotter on its inner — than its outer side, the inner side in this case being that side of the plastic mass contacting the support, the inner side will be hotter when the mass is pressed into the mould, so that a nice inner surface is obtained. The mould being cool, the container cools down rapidly. As one starts by thoroughly heating the plastic mass on the support, the result will be that the said mass for moulding any articles (containers) is properly and homogeneously distributed, at the same time being free from stresses.

Arbitrary pressures can be selected for removing the plastic material from the support, but a pressure ranging from 0.5 to 3 atmospheres is preferable. The plastic mass has e.g. a thickness ranging from 0.5 to 3 mm. For the process of deformation, the temperature of the support preferably ranges from 260° to 300° C.

What I claim is:

1. A method for manufacturing articles from synthetic resin material by means of a mould, said method comprising heating pulverulent synthetic resin material to sintering temperature on a nonporous support to form a layer of said resin material on the support, mounting the support with the layer thereon on a mould, heating the material on the support to a softened deformable condition in which the surface of the material in contact with the non-porous surface of the support is rendered devoid of pores, attaching the softened deformable material to the mould along a circumferential region thereof, peeling the material from said support in the region where the material is attached to the mould by displacing the mould and support relative to one another in a direction away from one another to provide a free space around the circumference of the mould and applying a pressure medium via said free space against the material from the circumference thereof towards its center to continue the peeling of the material from the support and the introduction of the material into the mould to assume the form thereof.

2. A method according to claim 1, comprising forming a plurality of said layers on said support, the size and composition of said layers mutually differing.

3. A method according to claim 1 wherein said layer is built up from a plurality of parts having components which are mutually different.

4. A method according to claim 1 wherein the support is mounted on an upper part of the mould when the mould is open, said softened deformable material being attached to said mould along the periphery of a lower mould part when the mould is closed.

5. A method according to claim 4 wherein said material is peeled from said support in said circumferential region by opening said mould.

* * * * *